United States Patent
Klingler et al.

(10) Patent No.: US 8,172,049 B2
(45) Date of Patent: May 8, 2012

(54) NOISE DAMPING FOR A QUIESCENT-CURRENT-ACTUAGED, ELECTROMAGNETIC SPRING PRESSURE BRAKE

(75) Inventors: Gunther Klingler, Oberostendorf (DE); Harald Weiss, Stottwang (DE); Christoph Dropmann, Kaufbeuren (DE)

(73) Assignee: Chr. Mayr GmbH & Co. KG, Mauerstetten (DE)

( * ) Notice: Subject to any disclaimer, the term of this patent is extended or adjusted under 35 U.S.C. 154(b) by 615 days.

(21) Appl. No.: 12/227,248

(22) PCT Filed: May 11, 2007

(86) PCT No.: PCT/EP2007/004205
§ 371 (c)(1),
(2), (4) Date: Jun. 15, 2009

(87) PCT Pub. No.: WO2007/131726
PCT Pub. Date: Nov. 22, 2007

(65) Prior Publication Data
US 2010/0025168 A1    Feb. 4, 2010

(30) Foreign Application Priority Data
May 13, 2006  (DE) .......................... 10 2006 022 491

(51) Int. Cl.
*B60T 13/04* (2006.01)
(52) U.S. Cl. .......................... 188/171; 188/156; 188/161
(58) Field of Classification Search .................. 188/171, 188/156, 158, 161, 163; 192/90; 310/77, 310/93; 254/378, 319, 275; 187/359
See application file for complete search history.

(56) References Cited

U.S. PATENT DOCUMENTS

| | | | |
|---|---|---|---|
| 3,357,528 A * | 12/1967 | Verlinde | 188/171 |
| 5,819,888 A * | 10/1998 | Tamura et al. | 188/218 XL |
| 6,129,184 A * | 10/2000 | Ferrand et al. | 188/170 |
| 6,202,804 B1 * | 3/2001 | Dropmann et al. | 188/171 |
| 6,237,730 B1 * | 5/2001 | Dropmann et al. | 188/171 |
| 7,063,190 B1 * | 6/2006 | Sylvan et al. | 188/161 |
| 7,073,641 B2 * | 7/2006 | Carriot | 188/171 |
| 7,958,977 B2 * | 6/2011 | Klingler et al. | 188/171 |

FOREIGN PATENT DOCUMENTS

| | | |
|---|---|---|
| DE | 195 00 589 A1 | 7/1996 |
| EP | 0 326 966 A2 | 8/1989 |
| EP | 0 907 840 B1 | 10/2001 |
| WO | WO 98/21496 * | 5/1998 |

* cited by examiner

*Primary Examiner* — Robert A Siconolfi
*Assistant Examiner* — Mariano Sy
(74) *Attorney, Agent, or Firm* — W. Norman Roth

(57) ABSTRACT

A quiescent-current-actuated electromagnetic spring pressure brake including torque transmission sleeves disposed between a machine wall and the brake, and an axially movable armature plate having bores along its periphery to receive the torque transmission sleeves. At least one piston guide ring is provided in the area of torque transmission sleeves on the outer periphery of the latter adjacent an O-ring disposed in a groove, said piston guide ring being placed in the groove of said O-ring or in a separate groove and acting to provide a damping action in the circumferential direction and a sliding displacement of the armature plate in the axial direction.

13 Claims, 2 Drawing Sheets

Einzelheit X

Figure 1:
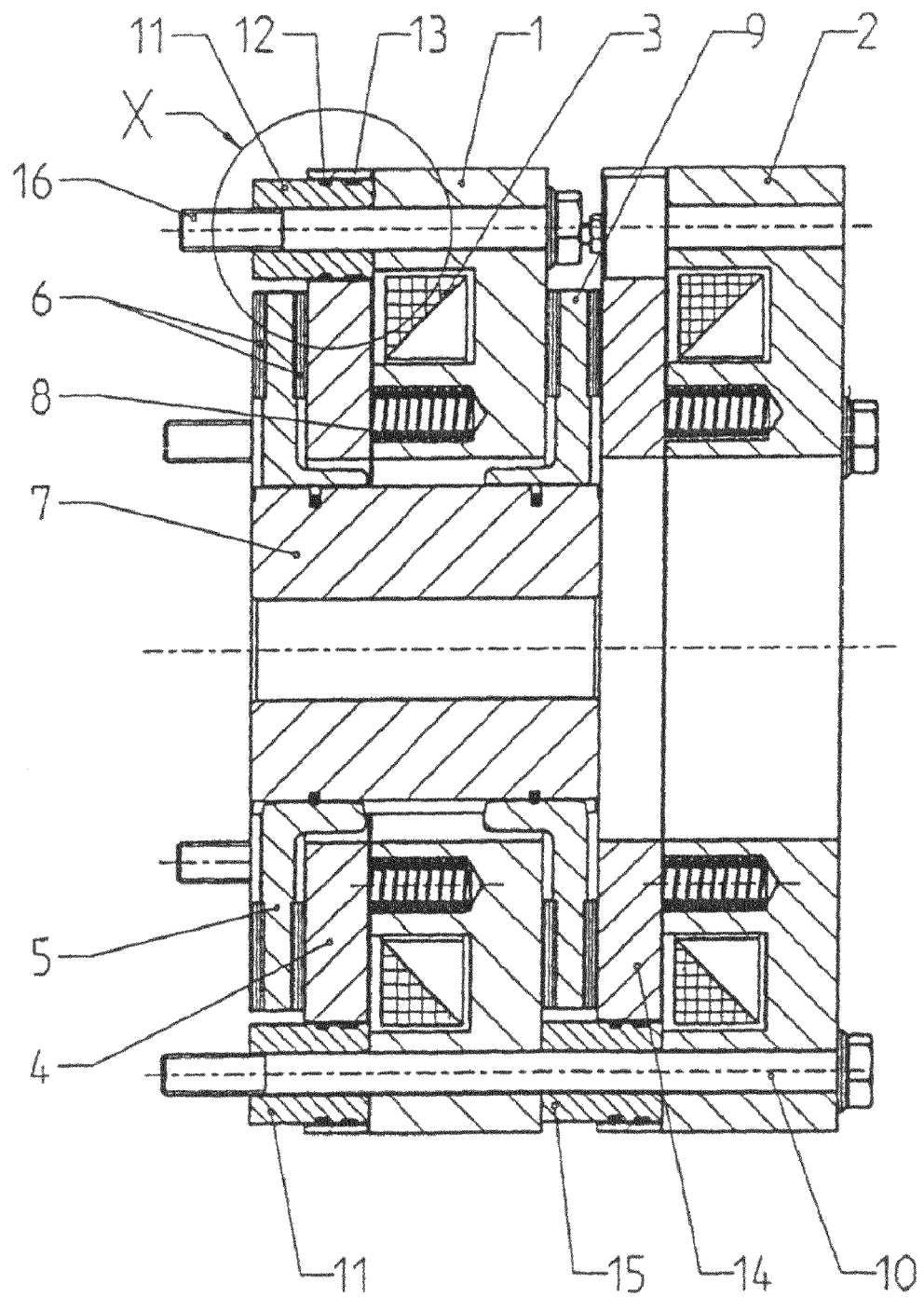

NOISE DAMPING FOR A QUIESCENT-CURRENT-ACTUAGED, ELECTROMAGNETIC SPRING PRESSURE BRAKE

The present invention relates to the noise damping of a brake, particularly a quiescent-current-actuated electromagnetic spring pressure brake of the type known by EP 0 907 840 B1 (see especially claims 9 and 10 thereof).

When actuating conventional brakes of this kind, one half of the braking torque is transmitted to the machine wall and the second half is transmitted from the rotor via the armature plate to a sleeve secured to the machine wall by means of a threaded fastener, thus transmitting the second half of the braking torque to the machine wall. As a result, the entirety of the braking torque is transmitted to the stationary machine wall when braking takes place.

When braking takes place, spring pressure acts to urge the armature plate against the rotor and its brake pads. This occurs in a very short period of time (in the millisecond range), the abrupt deceleration resulting in impact and grinding noises (squeal) of the armature plate on the sleeve.

The very small clearance between outer diameter of the sleeve and the armature plate results in the impacting of the armature plate on the sleeve causing annoying load transfer noises and squeals. In particular, very low-noise brakes are called for in the theatre stage and lift technologies.

In EP 0 907 840 B1, an O-ring inside the sleeve was used to maintain the coil carrier, which is axially movable but torsionally fixed, in its central position to attenuate noises as the brake operates. This effect was not optimal, however, so that further solutions were sought to improve the noise damping action.

The object underlying the invention is to obtain a noise-damping effect between the armature plate and the sleeve. The sleeve is firmly held in place by means of fastening screws and the armature plate is mounted on the sleeve for axial movement, i.e. it is connected to the sleeve in a circumferentially/rotationally fixed relationship. The clearance should be as small as possible on the one hand, and, on the other hand, suitable measures should be taken to keep the armature plate in an axially easily movable condition and damping should be provided to act in the circumferential direction.

The above object is attained by the features in patent claim 1, namely, by providing in or on the outer sleeve diameter in addition to the O-ring at least one piston guide ring, which ring is placed in an additional or in the same groove.

Thus, in accordance with the invention, at least one additional piston guide ring (13) is placed in the area of torque transmission sleeve (11) on the outer periphery thereof, said ring being placed in the groove of the O-ring or in a separate groove and acting to damp noises in the circumferential direction and to make possible a sliding displacement of the armature plate in the axial direction.

The piston guide ring permits an axial movement of the armature plate under very good slip conditions; damping is obtained in the circumferential direction as the armature plate does not directly strike the sleeve any longer but is kept away from the sleeve by the piston guide ring. On deceleration, the torque surge transmits in the circumferential direction a high load which the piston guide ring can accept. In the presence of only an O-ring, which does in fact contribute to damping as well, high loads (braking torque surges) may cause the armature plate to strike the sleeve, resulting in undesirable noise.

The task of the O-ring is to centre sleeve 11 and to retain it axially in armature plate 4; thus, torque transmission sleeve 11 cannot escape during transport or installation of the brake.

Alternatively, a plurality of O-rings 12 and piston guide rings 13 may be used, said rings sharing a common groove or each having a separate one.

Further, the grooves for O-rings 12 and piston guide rings 13 may be provided not in torque transmission sleeve 11 but in the bore of armature plate 4 so that O-rings 12 and piston guide rings 13 are stationary in armature plate 4 and slide on and along the smooth periphery of torque transmission sleeve 11.

As a preferred measure, a plurality of torque transmission sleeves 11 are equidistantly spaced adjacent the periphery, such plurality preferably being three or six in number.

For the rest, the torque transmission sleeves 11 may be shaped peripherally to not be round but oval, polygonal or rectangular, for example.

Figure 2:
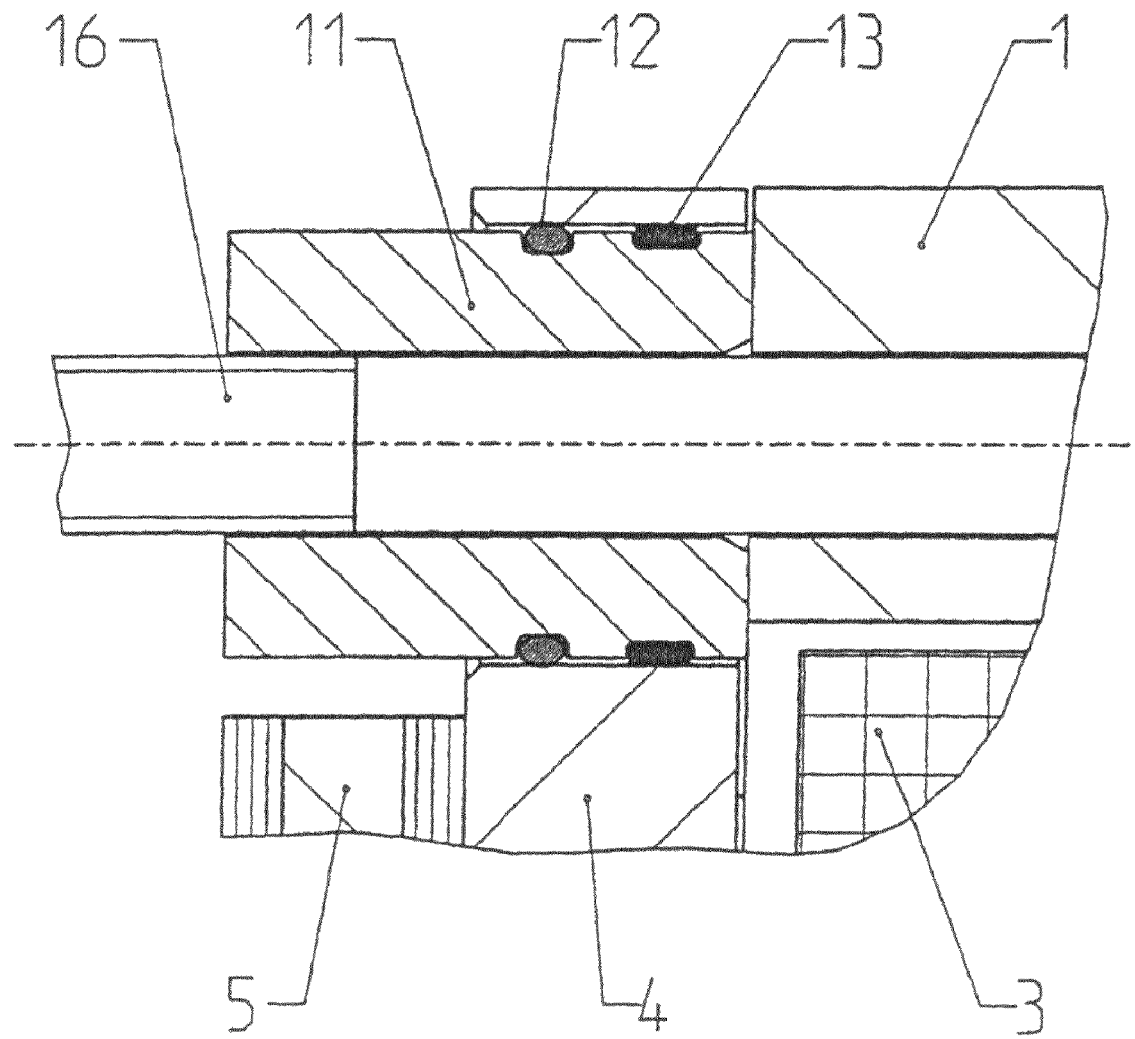

An embodiment example of the invention is shown in FIGS. 1 and 2 of the drawing.

FIG. 1 shows a quiescent-current-actuated electromagnetic spring pressure brake in the form of a dual-brake system of the kind used for redundancy in the theatre stage and lift technologies. Brakes 1 and 2 are attached to a machine wall (not shown; on the lefthand side of FIG. 1) by fastening screws 10, 16 respectively, and via torque transmission sleeves 15 and 11, respectively.

In what follows, only brake 1 will be described, brake 2 being functionally equivalent thereto.

With magnetic coil 3 being energized, armature plate 4 is attracted towards brake 1 against the action of compression springs 8; brake rotor 5 with its friction pads 6 is free to rotate. Rotor 5 is cirumferentially splined or keyed to circumferentially splined or keyed hub 7, which acts to transmit the brake torque to a shaft (not shown).

As brake 1 is de-energized, the magnetic field collapses and a plurality of circumferentially spaced compression springs 8 urge armature plate 4 against the machine wall (not shown). This causes rotor 5, which is coupled to splined hub 7, to be decelerated and the aforesaid shaft to come to a standstill. In the deceleration process, armature plate 4 is urged against torque transmission sleeve 11 in the direction of rotation. One half of the braking torque is transmitted via the torque transfer sleeve; the other half is passed on by brake rotor 5 directly via the lefthand brake pad 6 to the machine wall (not shown).

FIG. 2 shows detail X of torque transmission sleeve 11 in which an O-ring 12 and an additional piston guide ring 13 are placed on the outer periphery of torque transfer sleeve 11 inside a groove each, said grooves provided at a small axial mutual distance adjacent the O-ring within the axial extent of armature plate 4. Threaded fastener 16 of brake 1 extends through the bore of torque transmission sleeve 11, causing torque transmission sleeve 11 to be pressed onto the machine wall (not shown) and onto brake 1 and thus transmission one half of the braking torque.

Piston guide ring 13 is substantially rectangular in cross-section and comprises a band of a PTFE plastics material, which has good slip characteristics and is placed in the groove provided in sleeve 11, with its length matched to the circumference of the sleeve. Piston guide ring 13 permits high surface pressures to act in the direction of rotation while offering good axial slip characteristics.

As brake 1 is actuated, armature plate 4 does not always move in direction parallel to the plane of rotor rotation (because of unequal magnetic forces, for example); as a result, piston guide rings 13 on sleeves 11 experience high forces and tilting effects which an O-ring 12 alone would be incapable of damping.

The good axial slip characteristics of piston guide ring(s) 13 result automatically in an improved guidance of armature plate 4 in parallel with sleeve 11; armature plate 4 does not touch sleeve 11 any longer so that undesirable noises due to metal-on-metal grinding cannot develop.

LIST OF REFERENCE CHARACTERS

1 brake 1
2 brake 2
3 magnetic coil
4 armature plate
5 rotor
6 friction pads
7 splined or keyed hub
8 compression springs
9 brake 2 rotor
10 fastening screws, brake 1 and 2
11 torque transmission sleeve
12 O-ring
13 piston guide ring
14 brake 2 armature plate
15 brake 2 torque transmission sleeve
16 brake 1 threaded fastener

The invention claimed is:

1. A quiescent-current-actuated electromagnetic spring pressure brake including torque transmission sleeves disposed between a machine wall and said brake and secured to said machine wall by fastening screws, and an axially movable armature plate having bores along its periphery to receive said torque transmission sleeves in order to transmit the braking torques in a circumferential direction, said torque transmission sleeves having on the outer periphery thereof grooves with O-rings placed therein, characterized in that at least one piston guide ring is provided in the area of torque transmission sleeves on the outer periphery of the latter adjacent the O-ring disposed in a groove, said piston guide ring being placed in the groove of said O-ring or in a separate groove and acting to provide a damping action in the circumferential direction and a sliding displacement of the armature plate in the axial direction.

2. Brake as in claim 1, characterized in that said piston guide ring comprises a band of a PTFE plastics material and is matched in length to the circumference of a groove in said torque transmission sleeve.

3. Brake as in claim 1, characterized by a plurality of O-rings and piston guide rings being placed alternately in a single groove or in separate grooves.

4. Brake as in claim 1, characterized in that the grooves for O-rings and piston guide rings are provided in bores in the armature plate, whereby said O-rings and piston guide rings are fixed in said armature plate and slide axially along said torque transmission sleeve.

5. Brake as in claim 1, characterized by a plurality of torque transmission sleeves spaced equidistantly along the periphery of said brake.

6. Brake as in claim 1, characterized in that torque transmission sleeve is not round but oval, polygonal or rectangular in circumferential shape.

7. Brake as in claim 1, characterized in that said piston guide ring is made of PTFE or a comparable alternative material featuring similar slip characteristics and similarly high permissible surface pressures.

8. Brake as in claim 3, characterized in that the grooves for O-rings and piston guide rings are provided in bores in said armature plate, whereby said O-rings and piston guide rings are fixed in said armature plate and slide axially along said torque transmission sleeve.

9. Brake as in claim 8, characterized in that said piston guide ring comprises a band of a PTFE plastics material and is matched in length to the circumference of a groove in said torque transmission sleeve.

10. Brake as in claim 9, characterized by a plurality of torque transmission sleeves spaced equidistantly along the periphery of said brake.

11. Brake as in claim 10, characterized in that said torque transmission sleeve is not round but oval, polygonal or rectangular in circumferential shape.

12. Brake as in claim 10, characterized in that said piston guide ring is made of PTFE or a comparable alternative material featuring similar slip characteristics and similarly high permissible surface pressures.

13. Brake as in claim 12, characterized in that said torque transmission sleeve is not round but oval, polygonal or rectangular in circumferential shape.

* * * * *